(12) United States Patent
Deshmukh et al.

(10) Patent No.: US 7,630,994 B1
(45) Date of Patent: *Dec. 8, 2009

(54) ON THE FLY SUMMARIZATION OF FILE WALK DATA

(75) Inventors: Vijay Deshmukh, Mountain View, CA (US); Benjamin Swartzlander, San Jose, CA (US); Timothy J. Thompson, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 10/799,861

(22) Filed: Mar. 12, 2004

(51) Int. Cl.
*G06F 17/00* (2006.01)

(52) U.S. Cl. .......................... 707/101; 707/102

(58) Field of Classification Search ................. 707/101
See application file for complete search history.

(56) References Cited

U.S. PATENT DOCUMENTS

| | | | |
|---|---|---|---|
| 5,146,540 A | 9/1992 | Natarajan | |
| 5,313,631 A | 5/1994 | Kao | |
| 5,970,494 A | 10/1999 | Velissaropoulos et al. | |
| 5,987,506 A | 11/1999 | Carter et al. | |
| 5,999,930 A | 12/1999 | Wolff | |
| 6,052,724 A | 4/2000 | Willie et al. | |
| 6,138,249 A | 10/2000 | Nolet | |
| 6,199,082 B1 | 3/2001 | Ferrel et al. | |
| 6,292,797 B1 | 9/2001 | Tuzhilin et al. | |
| 6,298,349 B1 | 10/2001 | Toyoshima et al. | |
| 6,311,194 B1 | 10/2001 | Sheth et al. | |
| 6,389,427 B1 | 5/2002 | Faulkner | |
| 6,430,611 B1 * | 8/2002 | Kita et al. | 709/223 |
| 6,519,612 B1 | 2/2003 | Howard et al. | |
| 6,553,377 B1 | 4/2003 | Eschelbeck et al. | |
| 6,563,521 B1 | 5/2003 | Pettunen | |
| 6,571,257 B1 | 5/2003 | Duggan et al. | |
| 6,578,048 B1 | 6/2003 | Mauldin | |
| 6,625,615 B2 | 9/2003 | Shi et al. | |
| 6,725,261 B1 | 4/2004 | Novaes et al. | |
| 6,754,890 B1 | 6/2004 | Berry | |
| 6,801,903 B2 | 10/2004 | Brown et al. | |
| 6,857,012 B2 | 2/2005 | Sim et al. | |
| 6,915,409 B1 | 7/2005 | Peterson | |
| 6,922,708 B1 | 7/2005 | Sedlar | |
| 6,947,940 B2 | 9/2005 | Anderson et al. | |
| 6,973,577 B1 | 12/2005 | Kouznetsov | |

(Continued)

FOREIGN PATENT DOCUMENTS

WO   WO 02/25870   3/2002

OTHER PUBLICATIONS

David Marshall, Threads: Basic Theory and Libraries, May 1999, pp. 2-32.

*Primary Examiner*—John R. Cottingham
*Assistant Examiner*—Kimberly Lovel
(74) *Attorney, Agent, or Firm*—Perkins Coie LLP (57) ABSTRACT

According to an embodiment of the invention, a directory on a storage server is scanned. A number of children of the directory is determined, and the number is added to a reference count. A child is scanned to collect information about the child, and the information is combined into a summary of the directory. After the child is scanned, the reference count is reduced by one. According to another embodiment of the invention, the storage server is scanned by an agent separate from the storage server.

18 Claims, 6 Drawing Sheets

U.S. PATENT DOCUMENTS

| | | | |
|---|---|---|---|
| 7,013,323 B1 | 3/2006 | Thomas et al. | |
| 7,024,427 B2 | 4/2006 | Bobbitt et al. | |
| 7,054,927 B2 | 5/2006 | Ulrich et al. | |
| 7,080,277 B2 | 7/2006 | Anna et al. | |
| 7,089,313 B2 * | 8/2006 | Lee et al. | 709/227 |
| 7,096,315 B2 * | 8/2006 | Takeda et al. | 711/111 |
| 7,120,757 B2 | 10/2006 | Tsuge | |
| 7,139,811 B2 * | 11/2006 | Lev Ran et al. | 709/217 |
| 7,167,915 B2 | 1/2007 | Bendich et al. | |
| 7,275,063 B2 | 9/2007 | Horn | |
| 2002/0049782 A1 | 4/2002 | Herzenberg et al. | |
| 2002/0120672 A1 * | 8/2002 | Butt et al. | 709/202 |
| 2002/0147805 A1 * | 10/2002 | Leshem et al. | 709/223 |
| 2002/0175938 A1 * | 11/2002 | Hackworth | 345/751 |
| 2003/0046369 A1 | 3/2003 | Sim et al. | |
| 2003/0115218 A1 | 6/2003 | Bobbitt et al. | |
| 2004/0078461 A1 | 4/2004 | Bendich et al. | |
| 2004/0098363 A1 | 5/2004 | Anglin et al. | |
| 2004/0098383 A1 * | 5/2004 | Tabellion et al. | 707/3 |
| 2004/0122936 A1 * | 6/2004 | Mizelle et al. | 709/224 |
| 2004/0133606 A1 | 7/2004 | Miloushev et al. | |
| 2004/0143608 A1 | 7/2004 | Nakano et al. | |
| 2004/0181605 A1 | 9/2004 | Nakatani et al. | |
| 2004/0196970 A1 * | 10/2004 | Cole | 380/1 |
| 2004/0205143 A1 | 10/2004 | Uemura | |
| 2005/0050269 A1 | 3/2005 | Horn | |
| 2005/0086192 A1 | 4/2005 | Kodama | |
| 2005/0102289 A1 | 5/2005 | Sonoda et al. | |
| 2005/0108474 A1 | 5/2005 | Zhang et al. | |
| 2005/0108484 A1 | 5/2005 | Park | |
| 2005/0166094 A1 | 7/2005 | Blackwell et al. | |
| 2006/0041656 A1 | 2/2006 | Li et al. | |
| 2008/0091739 A1 * | 4/2008 | Bone et al. | 707/200 |

* cited by examiner

| Directory Name | No. of Files | Total Size | Average Access Time |
|---|---|---|---|
| /u/ | 2142 | 873 MB | 02-06-04 12:37 pm |
| /u/users/ | 18 | 47 MB | 03-01-04 3:17 pm |
| /u/administrators/ | 14,312 | 25.3 GB | 03-02-04 1:26 pm |
| /u/users/a/ | 42 | 1.2 MB | 08-06-03 3:18 am |
| /u/users/a/Aaron | 4,362 | 6.6 GB | 06-08-02 7:12 pm |

ON THE FLY SUMMARIZATION OF FILE WALK DATA

FIELD OF THE INVENTION

At least one embodiment of the present invention pertains to networked storage systems, and more particularly to a method and apparatus for collecting and reporting data pertaining to files stored on a storage server.

BACKGROUND

A file server is a type of storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

A filer may be connected to a network, and may serve as a storage device for several users, or clients, of the network. For example, the filer may store user directories and files for a corporate or other network, such as a LAN or a wide area network (WAN). Users of the network can be assigned an individual directory in which they can store personal files. A user's directory can then be accessed from computers connected to the network.

A system administrator can maintain the filer, ensuring that the filer continues to have adequate free space, that certain users are not monopolizing storage on the filer, etc. A Multi-Appliance Management Application (MMA) can be used to monitor the storage on the filer. An example of such an MMA is the Data Fabric Monitor (DFM) products made by Network Appliance, Inc. in Sunnyvale, Calif. The MMA may provide a Graphical User Interface (GUI) that allows the administrator to more easily observe the condition of the filer.

The MMA needs to collect information about files stored on the filer to report back to the administrator. This typically involves a scan, also referred to as a "file walk," of storage on the filer. During the file walk, the MMA can determine characteristics of files stored on the filer, as well as a basic structure, or directory tree, of the directories stored thereon. These results can be accumulated, sorted, and stored in a database, where the administrator can later access them. The MMA may also summarize the results of the file walk so they are more easily readable and understood by the administrator.

On a filer that manages a large amount of storage, the file walk can be a very resource intensive process. The results of a file walk typically must be processed after the walk is completed so that the results are easy for an administrator to comprehend. An MMA typically has many tasks to perform, and generally should be available for the administrator. What is needed is a way to reduce the load on an MMA while still maintaining and monitoring attached appliances.

SUMMARY OF THE INVENTION

A method for collecting data from a storage server is disclosed. A directory on the storage server is scanned. The number of children in the directory is determined, and the number is added to a reference count. The child is scanned to collect information about the child, and the information is combined into a summary of the directory. The reference count is reduced after scanning the child.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein are methods and apparatuses for On the Fly Summarization of File Walk Data. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, an agent, which is a server separate from a storage server, scans the storage server to determine information about files stored on the server. The information may include statistics such as the location and size of files, the date of creation of files, etc. The storage server may be scanned by one or more threads. While the agent is scanning the server and collecting information about the files, the server is generating summaries and updating existing summaries. The data may be collected and summarized on the fly, and since no further processing is required, the resulting summary can immediately be loaded onto a database server once the file walk is completed. At that point, an administrator can query the summary without requiring any further processing.

The MMA is generally a single server that is used to allow a system administrator to monitor a storage or file server. When a large storage server is monitored, the MMA may have difficulty performing its monitoring duties and a file walk at the same time. In fact, the file walk may make the MMA inaccessible to the system administrator, and the MMA may become a bottleneck, since it may be incapable of performing the file walk in a reasonable amount of time. According to an embodiment of the invention, independent agents are used to perform the file walk, to reduce the load on the MMA. The independent agents can run one or more threads to perform a file walk of the storage server. These threads can generate summaries about the files while the scan is occurring, so that less processing time is required when the summaries are queried at a later time.

Figure 1:
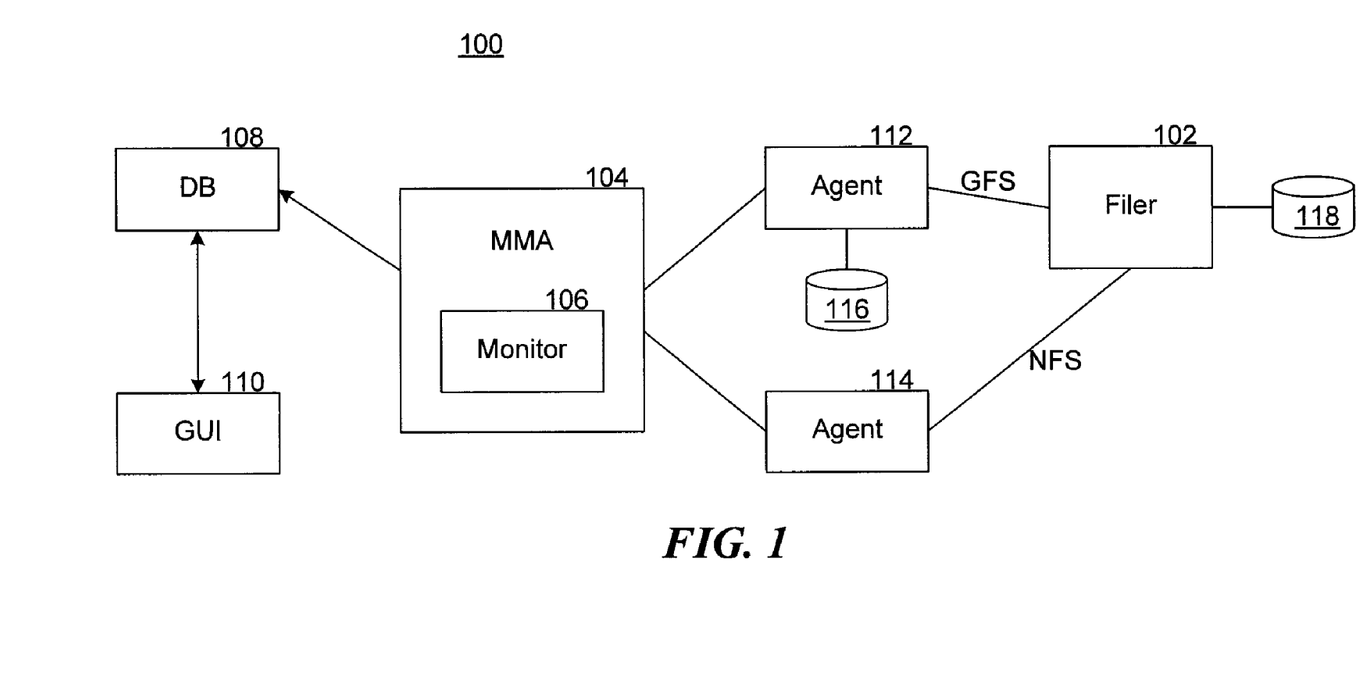
FIG. 1 illustrates a monitoring system for a storage server.

FIG. 1 illustrates a monitoring system for a storage server. The system 100 includes a filer 102, an MMA 104 including a monitor 106, a database 108, a graphical user interface (GUI) 110, and two agents 112 and 114. The agents 112 and 114 can perform a file walk of the filer 102 for the MMA 104. An agent may be an independent server that is attached to the network and is dedicated to performing file walks. By having an agent perform this task rather than having the MMA do it, the MMA can save its resources for other tasks, such as monitoring current activity on the filer 102 using the monitor 106. Ultimately, one goal is to minimize the amount of work the MMA is required to do.

Multiple agents can be added to perform a complete file walk in less time if necessary. For example, the MMA 104 may instruct two or more agents to each scan a subset of the directories found on the filer 102. Using multiple agents ensures that the file walk will be completed in less time. A system administrator can, through the MMA 104, customize the file walk, so that any number of agents can be used to increase the speed of the file walk.

According to one embodiment of the invention, the agents 112 and 114 may use a file system different from the one used by the filer 102. For example, the agent 112 uses the Common Internet File System (CIFS), while the agent 114 uses the Network File System (NFS). Here, either agent 112 or 114 is able to perform the file walk of the filer 102, regardless of the file system used by the filer 102. The agent 112 also has storage 116 to store the results of a file walk while the walk is occurring and before they are transferred to the MMA 104. The agent 114 may also have attached storage for this purpose.

The filer 102 is generally attached to a volume 118. The volume 118 may include one or more physical hard drives or removable storage drives that comprise the storage for the filer 102. For example, the volume 118 may comprise a RAID structure. The filer 102 may also be connected to other volumes that comprise storage. A file walk generally scans all files stored on the entire volume 118, regardless of whether all of the files are stored on the same physical drive. Further, although the volume 118 may contain several separate physical drives, the volume 118 may appear and function as a single entity.

The results of a file walk may be transferred to and stored on the database server 108 after the file walk is complete. The database server 108 can then be accessed by the GUI 110, so that an administrator can search the results of the file walk. The GUI 110 may allow the administrator to easily parse the results of a specific file walk, including allowing the administrator to monitor the total size of files stored on the filer, the size of particular directories and their subdirectories, the parents of specific directories, etc. These queries will be discussed in more detail below. The file walk may also collect statistics about the files on the filer, such as the total size of files, the most accessed files, the types of files being stored, etc. According to one embodiment, the GUI 110 may be a web-based Java application.

According to an embodiment of the invention, the summary is written to the database server 108 as a table or a histogram. The summary may then be accessed through a Java applet using a web browser such as Internet Explorer or Netscape. In another embodiment, the summaries are accessed using other programs. Although tables are shown here, it is understood that any appropriate manner of relaying the summary data to the administrator may be used.

Figure 2:
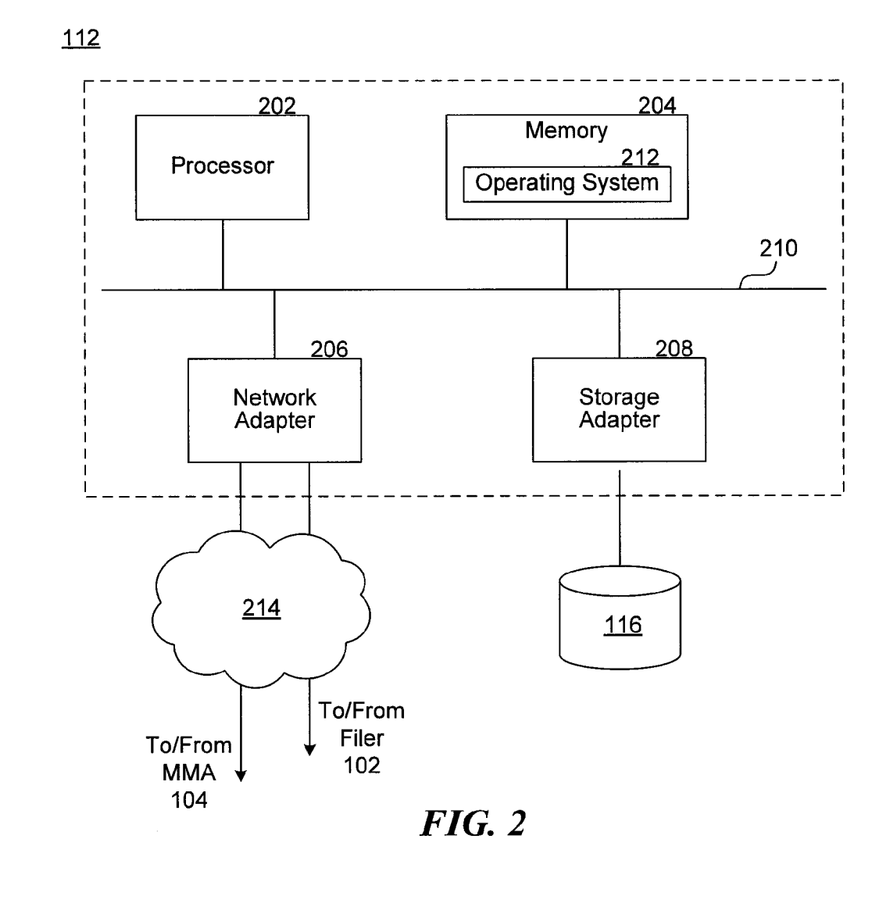
FIG. 2 illustrates a block diagram of an agent.

FIG. 2 illustrates a block diagram of an agent. The agent 112 includes a processor 202, a memory 204, a network adapter 206, and a storage adapter 208. These components are linked through a bus 210. The agent 112, as shown in FIG. 2, is typical of a network server or appliance, and it is understood that various different configurations may be used in its place. The agent 114 may be similar.

The processor 202 may be any appropriate microprocessor or central processing unit (CPU), such as those manufactured by Intel or Motorola. The memory 204 may include a main random access memory (RAM), as well as other memories including read only memories (ROM), flash memories, etc. The operating system 212 is stored in the memory 212 while the agent 112 is operating. The operating system includes the file system, and may be any operating system, such as a Unix or Windows based system. The network adapter 206 allows the agent 112 to communicate with remote computers over the network 214. Here, the agent 112 will be collecting data from the filer 102 and sending data to the MMA 104. The storage adapter 208 allows the agent 112 to communicate with the storage 116 and other external storage.

Figure 3A:
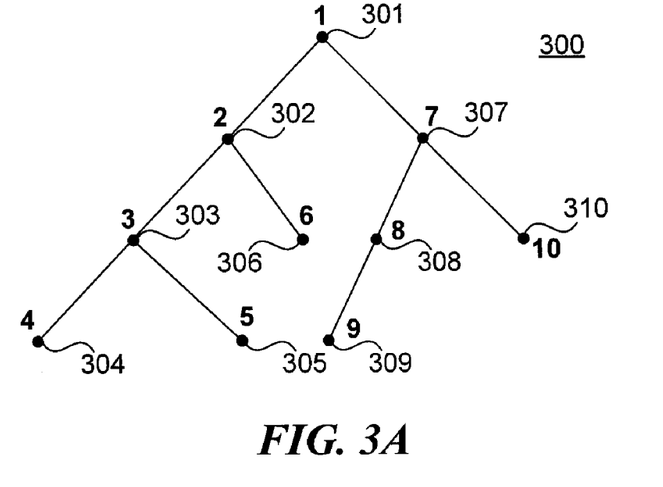
FIG. 3 is a flowchart illustrating a process for pre summarizing and analyzing results generated by an agent.

FIG. 3A illustrates a directory tree. The directory tree 300 may show a relationship between directories stored on a volume such as the volume 118. Each of the nodes 301-310 symbolizes a directory. The first node 301 is a "parent" to all other directories. Likewise, all the other directories are "children," or "child nodes" of the node 301. As another example, the node 303 is an "immediate child" of the node 302, and the node 302 is the parent of the node 303. The nodes 303 and 306 are "siblings," they both have the same parent and are located on the same level of the tree 300. The tree 300 can be used to represent a relationship between directories stored on a volume. The nodes 301-310 may be assigned identification (ID) numbers. The ID numbers shown here are 1-10. According to an embodiment of the invention, the ID numbers are assigned in a depth first search (DFS) order, in which the ID numbers are first assigned down through the tree, and then across the tree. The ID numbers can be used to identify specific directories.

Figure 3B:
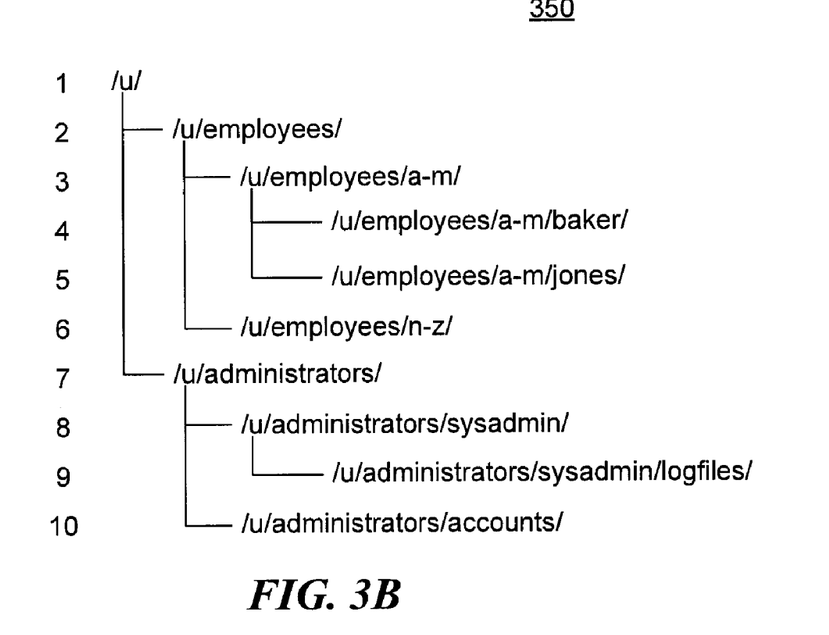

FIG. 3B illustrates the relationship between the directories in the tree 300. The structure 350 shows a directory structure of a typical volume 118. The directory structure 350 corresponds to the tree 300. The directory structure 350 shows how the directories are embedded within one another.

Figure 4:
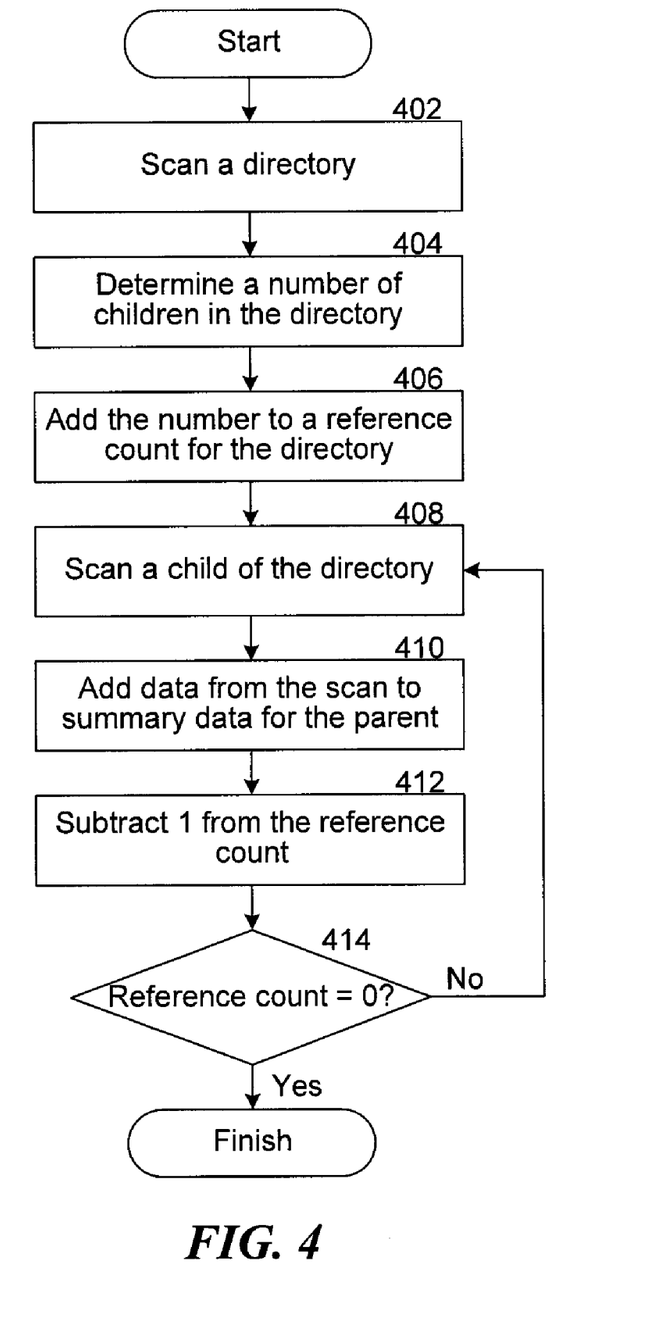
FIG. 4 illustrates a table displaying a list of interesting files

FIG. 4 is a flowchart illustrating a method of writing summarized data on the fly. During the file walk scanning, the agent 112 collects information about files stored on the volume 118. This information may include file names, directory names, file sizes, dates of creation, etc. The file walk may be performed by one or more 'threads.' A thread may be a program capable of operating independently of other programs. Using a single threaded system, the agent scans directories and files found on the volume 118 with a single thread. A multi-threaded system may include two or more threads. According to one embodiment, a file thread can be used to scan and determine characteristics of files, while a directory thread can be used to determine the contents of directories. A directory queue and a file queue are also established. The directory queue contains a list of directories to be examined. Likewise, the file queue contains a list of files to be examined.

The directory thread examines the directory found at the top of the directory queue, and places that directory's contents into the file queue. The file thread then examines the members of the file queue, placing directories in the directory queue and examining files. The file thread may collect information including the name of the file, the size of the file, the location of the file, the type of file, the time of creation of the file, the time of last access of the file, and the owner of the file. This information will be used to create tables and histograms such as the table in FIG. 5 and the histogram in FIG. 6. While the information is collected, the table and summaries are created on the fly. In other words, the agent 112 combines information collected into already established summaries as soon as the information is collected. The directory thread may also report information about the directory structure on the volume 118.

In block 402, a directory is scanned. The directory may be scanned by the directory thread, as mentioned above. The directory will typically be removed from the top of the directory queue. As an example, the directory symbolized by the node 303 is first scanned here. In block 404, a number of children or child nodes in the directory is determined. As can be seen in the tree 300, the node 303 has two children that are directories. A directory's children may also be the files stored within that directory. As an example, say that there are two files stored in the directory. Therefore, the directory '/u/employees/a-m' has four children. In block 406, the number of children is added to a reference count for the directory. Here, the reference count will have four added to it. If the directory thread had just begun scanning the directory, the reference count will start at zero. So here, the reference count will be four.

In block 408, a child of the directory is scanned. The child nodes of the directory may be listed in the file queue when the directory is scanned in block 402. The children of the directory may either be files or directories. The file thread determines whether the children are files or directories. If the child is a directory, the child is added to the front of the directory queue. If the child is a file, it is analyzed, its characteristics are determined, and combined with the characteristics of its parent in block 410. The characteristics of a directory are cumulatively summarized. For example, the agent 112 may keep a running total of the number of files found within a directory. If a file is encountered, this number is added to the total for either the current directory or for a parent of the current directory. In one embodiment, cumulative totals are kept for all directories. In other words, the statistics for a specific directory include the file statistics for all of the directory's children. For example, the cumulative total for the directory represented by the node 303 would include not only the files found within that directory, but also the files found within the directories represented by the nodes 304 and 305.

The agent 112 may keep track of many statistics. These statistics are updated during the file walk. For example, the largest and smallest file found may be tracked. When scanning a file, the agent 112 compares the size of the file with the size of the current largest and smallest file found. If the current file is either larger than the largest or smaller than the smallest file found, the current file becomes the new largest or smallest file. Other statistics are also tracked on the fly. For example, averages are reweighted with the statistics of the new file. Also, histogram counters are summed, a file's size is added to the total for the directory, the owner of the file is tracked and used for histograms, etc.

In block 412, the reference count is reduced by 1. This way, the file thread will know when no more children need to be scanned. Since the reference count will be equal to the number of children of a directory, the reference count ensures that all of the children of the directory are examined. In block 414, if the reference count is zero, the process 400 is finished. If the reference count is greater than zero, the process returns to block 408, where another child is examined.

The root directory is the parent of all other directories found on the filer 102. When the file walk of the root directory is completed, or when the root directory's reference count equals zero, the entire file walk is completed. As a result, the summaries and histograms are also completed, and may be imported into the database on the database server 108. According to an embodiment of the invention, the summaries and histograms are stored in a format compatible with the database software used on the database server 108. For example, the database server 108 may be running a database program by Sybase, Inc. The Sybase database includes a "LOAD TABLE" command. In order to expedite the transfer of the summaries and other data onto the database server 108, the data may be stored in a format that is compatible with the "LOAD" command. It is understood that other database suppliers may use different commands, and that the data may also be formatted to be used with these other commands.

The process 400 describes creating summaries of information about files stored on a volume 118. These summaries are created and updated while the agent 112 is initially examining the files, rather than at a later time. By having the agent 112 update and create summaries during the examination process, the process is simplified, and the amount of processing required is reduced.

Figure 5:
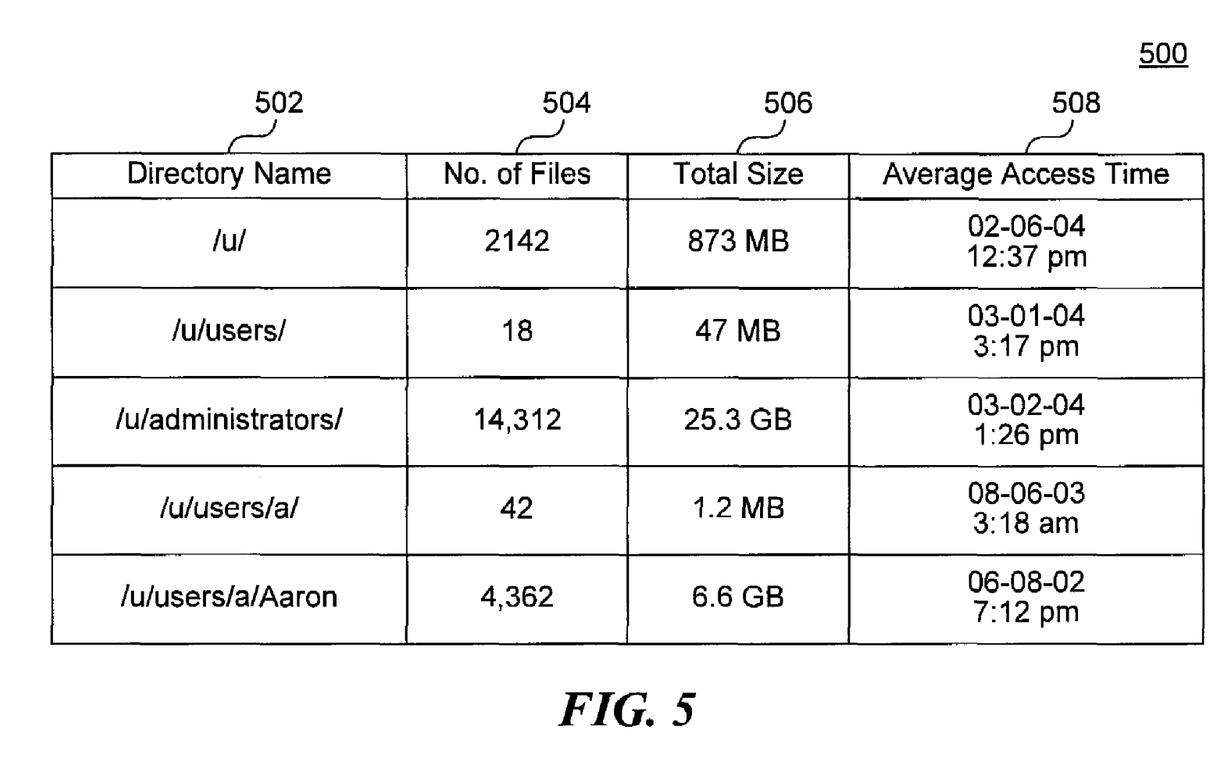
FIG. 5 illustrates a table listing information about directories on the server.
Figure 6:
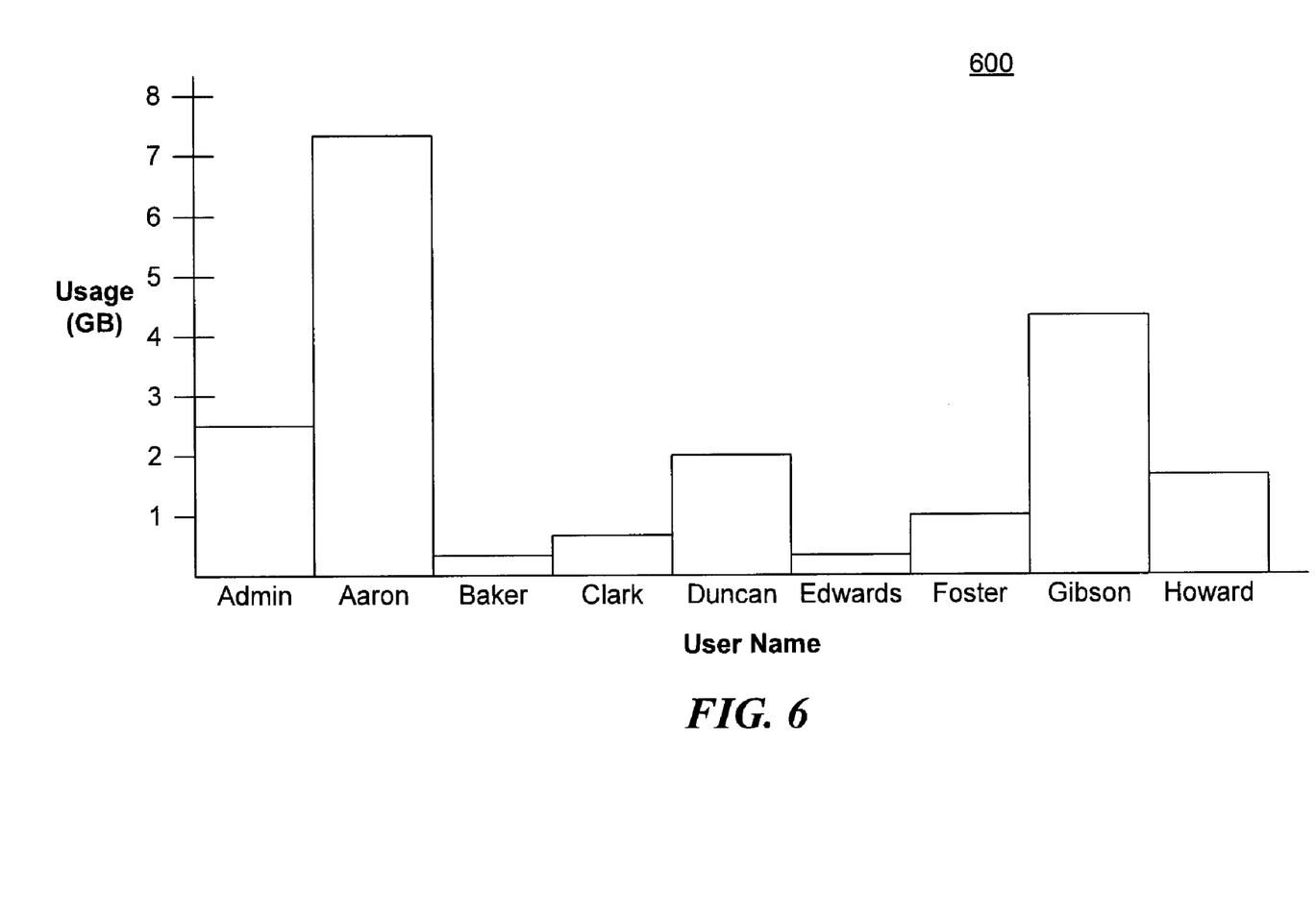
FIG. 6 illustrates a histogram showing server usage of certain users.

FIGS. 5 and 6 show graphical representations of the data stored on the server. FIG. 5 illustrates a table listing information about directories stored on the filer 102, and FIG. 6 shows a histogram displaying usages by certain users. These graphical representations may be created during the file walk using the process 400. These graphical representations are examples of representations of data. It is understood that many other representations are possible.

FIG. 5 illustrates a table 500 listing information about directories on the server 102. The table 500 is an example of information and data that may be reported to an administrator. This data is useful for maintaining the filer 102. The table 500 includes several columns, listing the directory name in the column 502, the number of files in the directory in the column 504, the total size of the files in the directory in the column 506, and the average time of the last access to files in the directory in the column 508. The agent 112 collects this information during the file walk, and compiles the table. The MMA 104, in many instances, does not have the resources to generate these tables or collect these results. This is especially true where there are several agents scanning a single storage server. Having the agents perform these tasks will save resources that the MMA 104 may require for other tasks.

The collected information about the directories on a storage server can be useful for several reasons. The administrator can find bottlenecks in the system, as well as directories that have an abnormally large number of files or total size. In other embodiments, another table, similar to the table 500 may be generated. This table may include cumulative statistics that list the total number of files in a directory, including the total statistics for all embedded directories found within that directory. For example, the column 506 may list the total size of all files in a directory and in the directory's subdirectories.

The column 508 lists the average last access time for the files located in the listed directory. The column 508 lists a time stamp, in other words, an average time during which all files in the directory were last accessed. For example, if a directory contained five files, one most recently accessed today, one yesterday, one two days ago, one three days ago, and the last four days ago, the average access time would be sometime two days ago. This is useful so that an administrator can easily determine how active the particular directory is, and whether there are a large number of files that are not being regularly accessed. For example, it appears that there are a number of stale files in the directory '/u/users/a/aaron/' since the average access time is over eighteen months ago.

FIG. 6 illustrates a histogram showing server usage of certain users. The histogram 600 demonstrates how much space each user is occupying on the volume 118. An administrator can use this data to determine whether one user is occupying an abnormally large amount of space. In one embodiment, the MMA 104 can use this information to revoke the user's ability to store any more files. For example, the users 'Aaron' and 'Gibson' are using much more storage space than the other users. The administrator can target these users to increase the amount of free space on the server, if needed.

The histogram 600 may be personalized by the administrator. For example, in a system with many users, it may be difficult for the administrator to parse the histogram 600. Therefore, the histogram 600 may list the users with the highest usage first, or only those users that are using more than a specified amount of storage space. A histogram showing the usage of many users may allow an administrator to determine the approximate percentage of users that are using an abnormally large amount of server space. It is understood that the data represented in the histogram 600 may also be displayed in other forms, such as in table form.

Although not shown, the histogram 600 may also show a number of files, in addition to, or in place of the size of the files as shown. For example, the agent 112 may generate a second histogram that shows the number of files stored by a certain user or the number of files of a certain file type. Further, the histogram 600 may include a second field for each user or file type that lists the number of files. It is also understood that other useful information may be displayed in this manner.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative, rather than in a restrictive sense.

What is claimed is:

1. An apparatus comprising:
    a storage server, coupled to a network, having a mass storage device;
    a multi-appliance management application (MMA) coupled to the network to manage the storage server; and
    a server computer including a first agent coupled to the storage server and the MMA via the network, the first agent to scan a first subset of a directory structure of the storage server to collect information about a file stored on the storage server, and to combine information collected into a summary of a directory in which the file is located, the summary being accessible to the MMA, wherein the server computer, the MMA, and the storage server are separate devices, wherein the first agent operates independently of the storage server and the MMA, and wherein the first agent uses a file system different from a file system that the storage server uses, wherein the first agent is configured to scan and summarize the first subset of the directory structure of the storage server by
        scanning a directory in the storage server to identify child nodes in the directory;
        scanning each of the child nodes in the directory in the storage server to collect information about the child nodes;
        combining the collected information about the child nodes into the summary of the directory, wherein said combining occurs concurrently with said scanning, for different items of information; and
        storing the summary of the directory in a storage facility accessible to the MMA;
    the first agent including a directory thread to scan directories and a separate file thread to scan files, wherein the first agent is one of a plurality of agents on the network, a second agent of the plurality of agents being configured to scan and summarize a second subset of the directory structure of the storage server, wherein the second agent operates independently of the first agent, the storage server and the MMA.

2. The apparatus of claim 1, further comprising a graphical user interface (GUI) coupled to the MMA.

3. The apparatus of claim 2, further comprising a database coupled to the MMA, the database to store the summary.

4. The apparatus of claim 3, wherein the summary can be is retrievable via the GUI.

5. The apparatus of claim 1, wherein the first agent uses Common Internet File System (CIFS) or Network File System (NFS).

6. The apparatus of claim 1, wherein the summary is in the form of a histogram.

7. The apparatus of claim 1, wherein the summary of the directory comprises an indication of per-user total storage usage for the directory.

8. The apparatus of claim 1, wherein the summary of the directory comprises an indication of average last access time, for a plurality of child nodes in the directory.

9. A method comprising:
    causing a first agent device, of a plurality of independently operable agent devices, to scan a file and directory structure of a storage server to collect information about files maintained by the storage server, including using the first agent to scan and summarize a first subset of a plurality of directories in the storage server, the first agent device including a directory thread to scan directories and a separate file thread to scan files, wherein scanning the file and directory structure of the storage server by the first agent includes
        scanning a directory in the storage server to identify child nodes in the directory;
        scanning each of the child nodes in the directory in the storage server to collect information about the child nodes;
    combining, by the first agent device, information collected into a summary of a directory under which the files are stored, including combining the collected information about the child nodes into the summary of the directory, wherein said combining occurs concurrently with said scanning, for different items of information;

sending the summary from the first agent device to a multi-appliance management application (MMA), wherein the first agent device, the MMA, and the storage server are separate devices, and wherein the first agent device uses a file system different from a file system that the storage server uses; and causing a second agent device, of the plurality of independently operable agent devices, to scan and summarize a second subset of the plurality of directories in the storage server, wherein the first agent device operates independently of the storage server and the MMA, and wherein the second agent device operates independently of the first agent device, the storage server and the MMA.

10. The method of claim 9, wherein the MMA sends the summary to a database server, which stores the summary as a table or a histogram.

11. The method of claim 9, wherein the first agent device uses Common Internet File System (CIFS) or Network File System (NFS).

12. A method comprising the steps of:
a) using a directory thread in a first agent, of a plurality of agents on a network, to scan and summarize a first subset of a plurality of directories in a storage server on the network, including using the first agent to scan a directory in the storage server to identify contents of the directory, the first agent being implemented in a server computer, separate from the storage server, on the network, wherein the first agent uses a file system different from a file system that the storage server uses;
b) determining, by the first agent, a number of child nodes in the directory in the storage server and incrementing a reference count by the number;
c) scanning, by the first agent, a child node in the directory in the storage server to collect information about the child node, wherein said scanning includes using a file thread in the first agent to scan and determine characteristics of a file in the directory;
d) combining, by the first agent, the collected information about the child node into a summary of the directory, the summary including a histogram;
e) decrementing the reference count after scanning the child node;
f) repeating said steps c) through e) for each of one or more additional child nodes in the directory until the reference count equals a predetermined value, wherein said combining occurs concurrently with said scanning, for different items of information;
g) storing, by the first agent, the summary of the directory in a storage facility accessible to a multi-appliance management application (MMA) configured to manage the storage server, wherein the first agent operates independently of the storage server and the MMA; and
h) using a second agent of the plurality of agents on the network, to scan and summarize a second subset of the plurality of directories in the storage server, wherein the second agent operates independently of the first agent, the storage server and the MMA.

13. The method of claim 12, wherein the summary of the directory comprises an indication of per-user total storage usage for the directory.

14. The method of claim 12, wherein the summary of the directory comprises an indication of average last access time, for a plurality of child nodes in the directory.

15. A computer system comprising:
a processor;
a communication interface, coupled to the processor, through which to communicate with a storage server on a network; and
a first agent, of a plurality of agents on the network, which configures the processor to execute a process that includes a set of steps, including
  scanning and summarizing a first subset of a plurality of directories in the storage server, including
    scanning a directory in the storage server to identify child nodes in the directory;
    scanning each of the child nodes in the directory in the storage server to collect information about the child nodes; and
    combining the collected information about the child nodes into a summary of the directory, wherein said combining occurs concurrently with said scanning, for different items of information;
  storing the summary of the directory in a storage facility accessible to a storage management application configured to manage the storage server, wherein the agent is operable independently of the storage server and the storage management application,
wherein the first agent uses a file system different from a file system that the storage server uses; and wherein the first agent includes a directory thread to scan a directory in the storage server to identify contents of the directory and a file thread to scan and determine characteristics of a file in the directory, wherein the first agent device operates independently of the storage server and the storage management application; and
a second agent of the plurality of agents configured to scan and summarize a second subset of a plurality of directories in the storage server.

16. The computer system of claim 15, wherein the summary of the directory is in the form of a histogram.

17. The computer system of claim 15, wherein the summary of the directory comprises an indication of per-user total storage usage for the directory.

18. The computer system of claim 15, wherein the summary of the directory comprises an indication of average last access time, for a plurality of child nodes in the directory.

* * * * *

UNITED STATES PATENT AND TRADEMARK OFFICE
CERTIFICATE OF CORRECTION

PATENT NO. : 7,630,994 B1  
APPLICATION NO. : 10/799861  
DATED : December 8, 2009  
INVENTOR(S) : Deshmukh et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Second Day of November, 2010

David J. Kappos
*Director of the United States Patent and Trademark Office*